Figure 1:
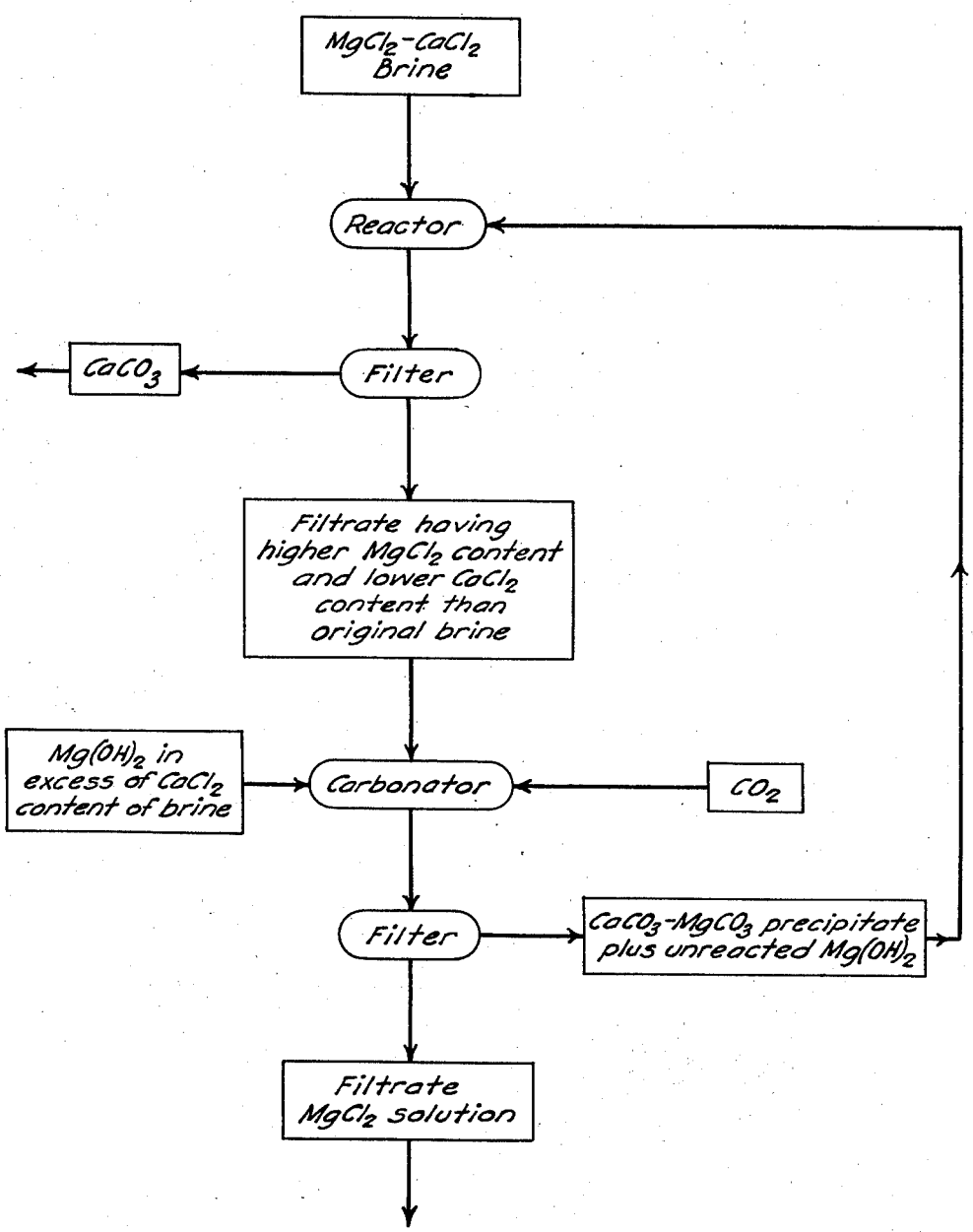

Patented Oct. 30, 1934

1,978,403

UNITED STATES PATENT OFFICE 1,978,403

PROCESS OF SEPARATING CALCIUM AND MAGNESIUM CHLORIDES

Edwin O. Barstow, Sheldon B. Heath, and Forest R. Minger, Midland, Mich., assignors to The Dow Chemical Company, Midland, Mich., a corporation of Michigan Application December 31, 1932, Serial No. 649,684

12 Claims. (Cl. 23—91)

The invention relates to processes of treating solutions containing calcium and magnesium chlorides, such as natural brines and the like, to separate said chlorides from each other.

One of the objects of our invention is to obtain from natural brines containing both calcium and magnesium chlorides a magnesium chloride solution substantially free from calcium chloride. Another object is to produce a calcium chloride solution that is substantially free from magnesium chloride.

A well known process of the present character involves precipitating the magnesium in the brine as hydroxide or adding magnesium hydroxide to the brine and treating the suspension of magnesium hydroxide in the calcium chloride solution with carbon dioxide, whereby the calcium is precipitated as carbonate and the magnesium is dissolved as chloride, according to the equation:—

(1) $Mg(OH)_2 + CO_2 + CaCl_2 = CaCO_3 + MgCl_2 + H_2O$

We have found that the above reaction does not result in a complete precipitation of calcium as carbonate unless the magnesium hydroxide is present in amount materially in excess of the proportion shown by the equation. By employing such excess of magnesium hydroxide and separating the precipitate formed in the reaction from the aqueous solution we are able to obtain a magnesium chloride solution substantially free from calcium chloride. However, the precipitate contains the excess of magnesium hydroxide, either unreacted or as carbonate, and it is necessary to devise a way of recovering the magnesium values in the precipitate which is both practical and economical.

We have found it most advantageous to carbonate the aforesaid reaction mixture to the point that substantially all of the excess of magnesium hydroxide is converted to carbonate. Consequently the precipitate which is filtered from the resulting magnesium chloride solution consists of a mixture of calcium and magnesium carbonates. To recover the magnesium values in the precipitate we employ the same for pretreating the original brine, whereby the precipitated magnesium carbonate reacts with the calcium chloride in the brine at ordinary temperatures to form magnesium chloride and calcium carbonate, according to the equation:—

(2) $MgCO_3 + CaCl_2 = MgCl_2 + CaCO_3$

If the calcium chloride is present in excess of equimolecular proportions, we have found that the conversion of magnesium carbonate to magnesium chloride is substantially quantitative. The pretreated brine, then, is enriched with respect to its magnesium chloride content, and correspondingly depleted with respect to calcium chloride. Such pretreated brine, after filtering off the calcium carbonate, may then be further processed as first described by suspending magnesium hydroxide therein in excess of the equimolecular proportion of the calcium chloride remaining therein and carbonating, the mixed magnesium and calcium carbonate precipitate thereby formed being returned for pretreating a further quantity of brine. The process may be thus conducted in cyclic manner to separate magnesium chloride from the brine, while the calcium content thereof is removed as calcium carbonate.

As a further extension of the process, the calcium carbonate separated from the brine may be calcined to produce carbon dioxide required in the carbonation step. Furthermore, the calcium oxide product of the calcination may then be slaked to form calcium hydroxide, and the latter employed for treating another portion of the original brine to form the magnesium hydroxide employed in the carbonation step. By such formation of magnesium hydroxide a residual calcium chloride solution is produced which upon separation from the hydroxide is obtained substantially free from magnesium chloride. In this way the original brine is divided into two portions, from one of which the magnesium content is separated as magnesium hydroxide, and from the other portion the calcium content is separated as calcium carbonate, while the solutions resulting from the two separations consist of solutions of calcium chloride and magnesium chloride, respectively, each chloride solution being substantially free from the other chloride. The two precipitates of magnesium hydroxide and calcium carbonate, respectively, are employed as intermediate products to accomplish the two separations aforementioned in the manner thus briefly described. The invention, then, consists in the steps and combinations of steps hereinafter more fully described in detail and illustrated in the annexed drawings.

In said annexed drawings:—

Fig. 1 shows a schematic diagram illustrating a preferred mode of carrying out our process to separate calcium chloride from a brine containing calcium and magnesium chlorides so as to produce magnesium chloride brine substantially free from calcium chloride.

Figure 2:
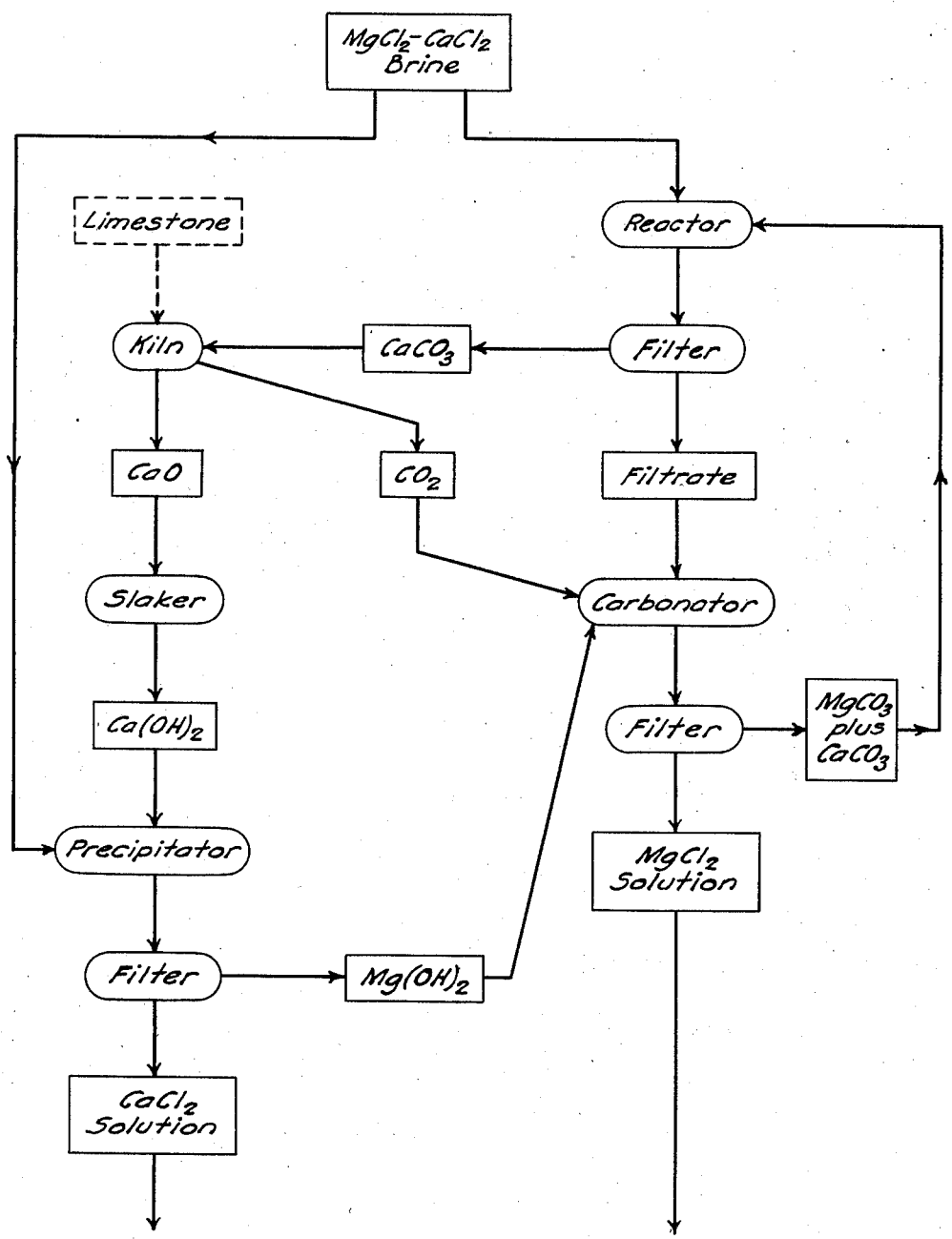

Fig. 2 shows a schematic diagram illustrating the process of Fig. 1 together with extensions thereto in which the calcium salt eliminated in said process is recovered as calcium carbonate which is calcined. The carbon dioxide obtained is used in the carbonation step, while the slaked quicklime is used to treat a portion of the original brine to produce calcium chloride brine substantially free from magnesium chloride and magnesium hydroxide for the carbonation step.

We will now describe our process of obtaining a brine containing magnesium chloride substantially free from calcium chloride from a brine containing both of these salts. Referring more particularly to the drawings in Fig. 1, brine containing calcium and magnesium chlorides in solution is brought into contact in a suitable reaction vessel with magnesium carbonate, preferably a mixture of precipitated magnesium carbonate and calcium carbonate prepared in a subsequent step, so as to bring about a conversion of substantially all of the magnesium carbonate into magnesium chloride, thereby reducing the calcium chloride content of the brine an equivalent amount and producing an equivalent amount of calcium carbonate. Such conversion may be brought about when less magnesium carbonate be added to the brine than corresponds to the calcium chloride therein. It is desirable to mix intimately the magnesium carbonate with the brine and to continue such mixing for from 2 to 30 minutes or more, although the conversion may be made by washing the precipitated carbonates held on a filter with the calcium chloride brine. The presence of other substances such as calcium carbonate and magnesium hydroxide which may be present in precipitated magnesium carbonate is not the least detrimental to the conversion step. Following such reaction the precipitated reaction products are separated from the brine by filtration or otherwise. The filtered brine is thus enriched with magnesium chloride and reduced in calcium chloride content.

We then proceed to precipitate out of the filtered brine the residual calcium chloride therein as calcium carbonate by carbonating the same in the presence of an excess of magnesium hydroxide. This is accomplished by suspending magnesium hydroxide in the brine and passing carbon dioxide thereinto in a suitable reactor, whereby substantially all of the calcium chloride is converted into calcium carbonate and magnesium chloride, while the excess of magnesium hydroxide is converted substantially into magnesium carbonate. A material excess, that is from 10 to 100 per cent or more, of magnesium hydroxide over the chemically equivalent amount of calcium chloride in the brine is required to obtain a complete precipitation of the dissolved calcium salt. The amount of magnesium carbonate formed depends upon the amount of the excess of magnesium hydroxide over that equivalent to the calcium chloride present. The magnesium carbonate so formed is recovered and employed in the first step, already indicated, to reduce the calcium chloride content of the brine.

The carbonation may be carried out in any suitable manner in which the brine and magnesium hydroxide suspended therein may be brought into contact with carbon dioxide. The amount of carbon dioxide absorbed varies with the concentration of magnesium hydroxide therein, the amount of diluents in the carbon dioxide, the time of contact, and other factors. We have found that 30 per cent or more of the carbon dioxide is absorbed using from 2 to 20 per cent or stronger carbon dioxide gas when the gas is bubbled through a depth of brine-hydroxide suspension of about 10 feet or more. Ordinarily the loss of carbon dioxide is more than compensated for by the presence of the additional carbon dioxide produced from the fuel used in the calcining step.

Following the carbonation step which may go to completion, as far as precipitating out substantially all of the calcium salt is concerned, within 10 to 20 hours under the conditions specified, the precipitated reaction products in the mixture are filtered off or otherwise separated from the brine. The precipitate contains calcium carbonate, magnesium carbonate, and any unreacted magnesium hydroxide. The precipitate is reacted with an excess of the original brine to produce magnesium chloride equivalent to the magnesium carbonate content thereof, as already described. The brine produced contains substantially all of the magnesium values originally in the brine plus the magnesium chloride equivalent of the magnesium hydroxide converted into magnesium chloride in the carbonation step and magnesium carbonate into magnesium chloride in the first step.

The calcium values in the brine which are eliminated therefrom as carbonate in the first step as indicated, together with any unreacted magnesium hydroxide, may be recovered advantageously according to an extension of the process, whereby we convert another portion of the original brine into calcium chloride brine substantially free from magnesium chloride and at the same time produce magnesium hydroxide and carbon dioxide for use in the carbonation step. This may be accomplished in cyclic manner in combination with the process for producing magnesium chloride brine. Referring to Fig. 2, the calcium carbonate precipitate from the first step is calcined to calcium oxide, then slaked with water. The slaked lime is brought into contact in a precipitator vessel with a sufficient quantity of another portion of magnesium chloride-calcium chloride brine so as to convert substantially all of the magnesium chloride therein into magnesium hydroxide with the formation of a corresponding quantity of calcium chloride. The magnesium hydroxide formed is then filtered off or otherwise separated from the resulting brine, thereby producing a calcium chloride solution which is substantially free from magnesium chloride.

The precipitated magnesium hydroxide thus obtained, together with the carbon dioxide from the calcination step, is used in the carbonator, as already described. It is desirable to wash the precipitated magnesium hydroxide with the original brine or substantially calcium chloride-free magnesium chloride brine before running it to the carbonator so as to displace adhering calcium chloride brine. The magnesium chloride brine for this purpose may be taken from the process or from the original source and the brine displaced from the precipitated magnesium hydroxide returned to the precipitator in which the magnesium hydroxide is produced.

Calcium carbonate losses may be made up when necessary by calcining limestone or dolomite, together with the precipitated calcium carbonate formed in the process, or calcined dolomite, limestone, or the like, may be used instead of the precipitated carbonate formed in the process as a source of quicklime. This alternative or augmenting supplying of limestone is indicated by the broken lines in the schematic diagram shown in Fig. 2.

*Example*

A portion of natural brine containing about 3.4 per cent of magnesium chloride and 9.5 per cent of calcium chloride was mixed with the precipitate obtained by carbonating an excess of magnesium hydroxide suspended in calcium chloride-magnesium chloride brine. The precipitate contained about 17 per cent of magnesium carbonate, 36 per cent of calcium carbonate, and a small amount of magnesium hydroxide, the balance being brine. The mixing was carried out in a tank and continued for about 15 minutes. The precipitated calcium carbonate formed in the reaction, together with the calcium carbonate and magnesium hydroxide which were introduced with the magnesium carbonate, were filtered off, washed, and led to the kiln for calcination to quicklime and carbon dioxide, while the filtrate which contained about 6.5 per cent of magnesium chloride and 5.3 per cent of calcium chloride was led to the carbonator to be treated with carbon dioxide and magnesium hydroxide to remove the remaining calcium chloride. For this purpose magnesium hydroxide prepared by treating another portion of the natural brine with the slaked product obtained on calcining and slaking the calcium carbonate precipitate from the first step, was suspended in the filtrate and carbon dioxide bubbled therethrough. The amount of magnesium hydroxide used was about 30 per cent in excess of an equimolecular proportion of the calcium chloride in the brine. The depth of the magnesium hydroxide-brine suspension through which the carbon dioxide was bubbled was about 17 feet. The carbon dioxide was obtained from the kiln gases produced on calcining the calcium carbonate precipitate and contained about 16 per cent of carbon dioxide. The concentration of the magnesium hydroxide suspended in the brine at the beginning of the carbonation was about 4.7 per cent, while the concentration of the magnesium and calcium chlorides therein were respectively 5.7 and 5.3 per cent. The duration of the carbonation was 18 hours. At the end of the carbonation approximately 90 per cent of the magnesium hydroxide was converted into magnesium carbonate or chloride. The suspended solids in the brine were then separated by filtration leaving a clear brine containing about 10.7 per cent of magnesium chloride and less than 0.05 per cent of calcium chloride. The suspended solids containing magnesium carbonate, etc., filtered from the carbonated brine suspension, were returned to the first reaction vessel to pretreat the brine, as already described.

The portion of the brine from which magnesium hydroxide was obtained on separating it therefrom contained 13.8 per cent of calcium chloride. The magnesium chloride content was less than the usual analytical methods were capable of estimating. Thus in this example, which is illustrative of a mode of carrying out the invention, we produced, on the one hand, a magnesium chloride brine substantially free from calcium chloride and, on the other, a calcium chloride brine substantially free from magnesium chloride from a natural brine containing both calcium and magnesium chloride.

The process is effective to separate the chlorides of calcium and magnesium in the presence of the chlorides of other metals that do not form insoluble hydroxides and carbonates, such as sodium, potassium, and the like. Small amounts of iron, manganese, and the like that form insoluble hydroxides and carbonates which may be present in natural brines do not interfere with the separation. These substances may be removed from the brine by a pretreatment with lime or other suitable precipitant. It is usually more convenient, however, to allow the iron and manganese or the like to be precipitated in the process when the slaked lime is added to the brine, inasmuch as these impurities will then be carried through the carbonation step back to the kiln where they form insoluble substances easily separated from the slaked lime by passing the slaked lime through a classifier, whereby the fine slaked lime particles separate from the coarser particles of impurities.

Although carbonating the brine directly in the presence of magnesium hydroxide suspended therein, as described, has certain advantages and reduces the number of operations required to precipitate the residual calcium compared to the indirect method of carbonating magnesium hydroxide in water substantially free from dissolved salts to form magnesium carbonate, separating the water from the carbonate and then introducing the separated carbonate into the brine, this indirect method of carbonation may be employed. However, by carbonating the brine directly, the excess of magnesium hydroxide forms an easily filterable precipitate mixed with calcium carbonate and thus avoids the formation of the difficultly filterable gelatinous magnesium carbonate which is obtained when carbonating in water.

Other modes of applying the principle of our invention may be employed instead of the one explained, change being made as regards the method herein disclosed, provided the steps stated by any of the following claims or the equivalent of such steps be employed.

We therefore particularly point out and distinctly claim as our invention:—

1. The method of separating calcium and magnesium compounds from each other in a solution containing the chlorides thereof which comprises treating the solution with magnesium carbonate in amount less than an equimolecular proportion to the calcium chloride present, separating the precipitated calcium carbonate from the resulting solution, suspending magnesium hydroxide in the solution obtained in amount in excess of an equimolecular proportion to the calcium chloride therein, treating the suspension with carbon dioxide, and then separating the precipitated carbonates from the resulting magnesium chloride solution.

2. The method of separating calcium and magnesium compounds from each other in a solution containing the chlorides thereof which comprises treating the solution with magnesium carbonate in amount less than an equimolecular proportion to the calcium chloride present, separating the precipitated calcium carbonate from the resulting solution, suspending magnesium hydroxide in the solution obtained in amount in excess of an equimolecular proportion to the calcium chloride therein, treating the suspension with carbon dioxide, separating the precipitated carbonates from the resulting magnesium chloride solution, and returning the separated carbonates to the first step.

3. In a method of treating calcium chloride-magnesium chloride brine, the steps which consist in adding magnesium carbonate to a quantity of such brine containing a greater amount of calcium chloride than that chemically equivalent to the magnesium carbonate added so as to precipitate substantially all of the carbonate as calcium carbonate and form magnesium chloride, separating the resulting solution from the calcium carbonate, suspending magnesium hydroxide in the separated solution in amount in excess of the calcium chloride therein, bringing a sufficient amount of carbon dioxide gas into contact with the suspension to convert substantially all of the calcium chloride therein into calcium carbonate and the excess of magnesium hydroxide into magnesium carbonate, and separating the resulting solution from the calcium and magnesium carbonates.

4. In a method of treating calcium chloride-magnesium chloride brine, the steps which consist in adding magnesium carbonate to a quantity of such brine containing a greater amount of calcium chloride than that chemically equivalent to the magnesium carbonate added so as to precipitate substantially all of the carbonate as calcium carbonate and form magnesium chloride, separating the resulting solution from the calcium carbonate, suspending magnesium hydroxide in the separated solution in amount in excess of the calcium chloride therein, bringing a sufficient amount of carbon dioxide gas into contact with the suspension to convert substantially all of the calcium chloride therein into calcium carbonate and the excess of magnesium hydroxide into magnesium carbonate, separating the calcium and magnesium carbonates so formed from the resulting solution, and returning the carbonates so obtained to the first step.

5. In a method of treating calcium chloride-magnesium chloride brine, the steps which consist in adding calcium and magnesium carbonates, formed in the carbonation of calcium-magnesium chloride solution in the presence of an excess of magnesium hydroxide, to calcium chloride-magnesium chloride brine containing a greater amount of calcium chloride than that chemically equivalent to the magnesium carbonate added so as to precipitate substantially all of the carbonate as calcium carbonate and form magnesium chloride, separating the resulting solution from the calcium carbonate, suspending magnesium hydroxide in the separated solution in amount in excess of an equimolecular proportion to the calcium chloride therein, bringing a sufficient amount of carbon dioxide gas into contact with the suspension to convert substantially all of the calcium chloride therein into calcium carbonate and the excess of magnesium hydroxide into magnesium carbonate, and separating the calcium and magnesium carbonates so formed from the resulting solution.

6. In a method of treating calcium chloride-magnesium chloride brine, the steps which consist in adding calcium and magnesium carbonates, formed in the carbonation of calcium-magnesium chloride solution in the presence of an excess of magnesium hydroxide, to calcium chloride-magnesium chloride brine containing a greater amount of calcium chloride than that chemically equivalent to the magnesium carbonate added so as to precipitate substantially all of the carbonate as calcium carbonate and form magnesium chloride, separating the resulting solution from the calcium carbonate, suspending magnesium hydroxide in the separated solution in amount in excess of an equimolecular proportion to the calcium chloride therein, bringing a sufficient amount of carbon dioxide gas into contact with the suspension to convert substantially all of the calcium chloride therein into calcium carbonate and the excess of magnesium hydroxide into magnesium carbonate, separating the calcium and magnesium carbonates so formed from the resulting solution, and returning the carbonates so obtained to the first step.

7. In a method of producing substantially calcium chloride-free magnesium chloride solution, the combination of steps which comprises reacting an excess of calcium chloride-magnesium chloride brine with the precipitated solids formed in carbonating an excess of magnesium hydroxide suspended in calcium chloride-magnesium chloride solution, separating the resulting precipitated solids from the solution, carbonating the resulting solution in the presence of magnesium hydroxide in amount in excess of an equimolecular proportion to the calcium chloride therein, and separating the calcium and magnesium carbonates so formed from the resulting solution.

8. In a method of producing substantially calcium chloride-free magnesium chloride solution, the combination of steps which comprises reacting an excess of calcium chloride-magnesium chloride brine with the precipitated solids formed in carbonating an excess of magnesium hydroxide suspended in calcium chloride-magnesium chloride solution, separating the resulting precipitated solids from the solution, carbonating the resulting solution in the presence of magnesium hydroxide in amount in excess of an equimolecular proportion to the calcium chloride therein, separating the calcium and magnesium carbonates so formed from the resulting solution, and returning said carbonates to the first step.

9. In a method of treating a brine containing calcium chloride and magnesium chloride to produce a substantially calcium chloride-free magnesium chloride solution and a substantially magnesium chloride-free calcium chloride solution therefrom, the combination of steps which comprises reacting an excess of one portion of such brine with precipitated magnesium and calcium carbonates so as to convert substantially all of the magnesium carbonate into magnesium chloride and calcium carbonate, separating the resulting solution and calcium carbonate suspended therein from each other, carbonating the separated solution in the presence of magnesium hydroxide in amount in excess of an equimolecular proportion to the calcium chloride therein so as to convert substantially all of the said calcium chloride into calcium carbonate and the excess magnesium hydroxide into magnesium carbonate, separating the resulting precipitated carbonates from the substantially calcium chloride-free magnesium chloride solution thereby produced and returning said precipitated carbonates to the first step, calcining the calcium carbonate derived from the first step to form quicklime and carbon dioxide, slaking the quicklime in water, adding the slaked lime to such an amount of another portion of said calcium chloride-magnesium chloride brine that the amount of magnesium chloride therein is substantially in equimolecular proportion to the slaked lime so as to form magnesium hydroxide and substantially magnesium chloride-free calcium chloride solution, and separating the magnesium hydroxide from said solution.

10. In a method of treating a brine containing calcium chloride and magnesium chloride to produce a substantially calcium chloride-free magnesium chloride solution and a substantially magnesium chloride-free calcium chloride solution therefrom, the combination of steps which comprises reacting an excess of one portion of such brine with precipitated magnesium and calcium carbonates so as to convert substantially all of the magnesium carbonate into magnesium chloride and calcium carbonate, separating the resulting solution and calcium carbonate suspended therein from each other, carbonating the separated solution in the presence of magnesium hydroxide in amount in excess of an equimolecular proportion to the calcium chloride therein so as to convert substantially all of the said calcium chloride into calcium carbonate and the excess magnesium hydroxide into magnesium carbonate, separating the resulting precipitated carbonates from the substantially calcium chloride-free magnesium chloride solution thereby produced and returning said precipitated carbonates to the first step, calcining the calcium carbonate derived from the first step to form quicklime and carbon dioxide, slaking the quicklime in water, adding the slaked lime to such an amount of another portion of said calcium chloride-magnesium chloride brine that the amount of magnesium chloride therein is substantially in equimolecular proportion to the slaked lime so as to form magnesium hydroxide and substantially magnesium chloride-free calcium chloride solution, separating the magnesium hydroxide from said solution, and introducing the same into the aforementioned carbonating step.

11. In a method of treating a brine containing calcium chloride and magnesium chloride to produce a substantially calcium chloride-free magnesium chloride solution and a substantially magnesium chloride-free calcium chloride solution therefrom, the combination of steps which comprises reacting an excess of one portion of such brine with precipitated magnesium and calcium carbonates so as to convert substantially all of the said magnesium carbonate into magnesium chloride and calcium carbonate, separating the resulting solution and calcium carbonate suspended therein from each other, calcining the calcium carbonate so obtained to form quicklime and carbon dioxide, carbonating the separated solution with the carbon dioxide so obtained in the presence of magnesium hydroxide in amount in excess of an equimolecular proportion to the calcium chloride therein so as to convert substantially all of the calcium chloride into calcium carbonate and the excess of magnesium hydroxide into magnesium carbonate, separating the solution thereby produced from the magnesium and calcium carbonates and returning the carbonates so separated to the first step, slaking in water the aforementioned quicklime, adding the slaked lime thus obtained to such an amount of another portion of said calcium chloride-magnesium chloride brine that the amount of magnesium chloride therein is substantially in equimolecular proportion to the slaked lime added so as to form magnesium hydroxide and substantially magnesium chloride-free calcium chloride solution, and separating the magnesium hydroxide from said solution.

12. In a method of treating a brine containing calcium chloride and magnesium chloride to produce a substantially calcium chloride-free magnesium chloride solution and a substantially magnesium chloride-free calcium chloride solution therefrom, the combination of steps which comprises reacting an excess of one portion of such brine with precipitated magnesium and calcium carbonates so as to convert substantially all of the said magnesium carbonate into magnesium chloride and calcium carbonate, separating the resulting solution and calcium carbonate suspended therein from each other, calcining the calcium carbonate so obtained to form quicklime and carbon dioxide, carbonating the separated solution with the carbon dioxide so obtained in the presence of magnesium hydroxide in amount in excess of an equimolecular proportion to the calcium chloride therein so as to convert substantially all of the calcium chloride into calcium carbonate and the excess of magnesium hydroxide into magnesium carbonate, separating the solution thereby produced from the magnesium and calcium carbonates and returning the carbonates so separated to the first step, slaking in water the aforementioned quicklime, adding the slaked lime thus obtained to such an amount of another portion of said calcium chloride-magnesium chloride brine that the amount of magnesium chloride therein is substantially in equimolecular proportion to the slaked lime added so as to form magnesium hydroxide and substantially magnesium chloride-free calcium chloride solution, separating the magnesium hydroxide from said solution, and returning the magnesium hydroxide so separated to the carbonation step.

EDWIN O. BARSTOW.
SHELDON B. HEATH.
FOREST R. MINGER.